United States Patent Office 3,332,918
Patented July 25, 1967

3,332,918
VINYL CHLORIDE SEED TECHNIQUE POLYMERIZATION USING EMULSIFYING SYSTEMS COMPRISING TWO AMMONIUM SALTS OF DIFFERENT SULPHOCARBOXYLIC ACID ESTERS
Gianni Benetta and Giorgio Gatta, Mestre, Venice, and Francesco Testa, Padova, Italy, assignors, by mesne assignments, to Edison, Milan, Italy, a corporation of Italy
No Drawing. Filed Dec. 12, 1963, Ser. No. 329,952
Claims priority, application Italy, Dec. 21, 1962, 25,089/62
9 Claims. (Cl. 260—85.5)

This invention relates to the polymerization and copolymerization in aqueous emulsion of vinyl chloride.

More specifically the invention relates to the emulsion polymerization and copolymerization of vinyl chloride by a seeding technique in which a previously prepared seed latex having small or uniform particles is charged into the polymerization autoclave in the presence of water, emulsifying agent, catalyst, and buffer, as well as the monomer or mixture of monomers to be polymerized, to obtain a final latex which has particles of larger sizes and distributed at larger intervals.

The pastes or "plastisols" which result from mixing the polyvinyl chloride obtained by conventional seeding processes with the usual plasticizers enclose air during their preparation, and this air is difficult to eliminate spontaneously unless a special vacuum treatment is used. The presence of air in the paste often results in articles made from these pastes, for example by the rotating mould, smearing immersion moulding, and reject moulding techniques, having a large number of bubbles varying in size, so that the articles have a poor appearance and their mechanical strength is impaired.

The invention has been made out of a consideration of the above noted disadvantages of the products of the conventional seeding technique processes.

In accordance with the invention there is provided a process for the emulsion polymerization by the seeding technique of vinyl chloride either alone, or with other vinyl monomers copolymerizable therewith to produce copolymers containing at least 75% polymerized vinyl chloride, in which over at least the greater part of the period of the polymerization or copolymerization reaction there is continuously added to the aqueous emulsion an emulsifying system consisting of a mixture of two ammonium salts of different sulphocarboxylic acid esters, one of which has the general formula:

COOR
|
(CH₂)ₙ
|
CH—SO₃NH₄
|
COOR in which n is 1, 2 or 3, and R is a straight or branched-chain alkyl radical containing from 4 to 6 carbon atoms; and the other of which has the general formula:

COOR*
|
(CH₂)ₙ'
|
CHSO₃NH₄
|
COOR* in which n is 1, 2 or 3, and R is a straight or branched-chain alkyl radical containing from 8 to 13 carbon atoms.

The polymers obtained by the process of the invention can be mixed with any of the usual plasticizers, for example dioctyl-phthalate, to produce pastes which are ready de-aerated, and which can be made by the usual techniques into articles which are free, or substantially so, of bubbles.

In the preferred manner of carrying out the process of the invention, water, a part of the latex-seed (previously prepared and preferably always by the same method) and a buffering substance is charged into the autoclave. After removing oxygen from the autoclave, the reducing agent and a portion of the vinyl chloride monomer or mixture of monomers are added. The bath is brought to the required temperature and polymerization or copolymerization started by initiating the addition of the catalyst solutions, the emulsifying system, and the remaining portion of monomer or mixtures of monomers, all of which are introduced into the aqueous emulsion continuously over at least the greater part of the period of the reaction. At or near the conclusion of the reaction a quantity of an emulsifying agent is added in order to stabilize the polymer or copolymer latex. Preferably the stabilizing emulsifying agent is one of the constituents of the emulsifying system added during the polymerization reaction.

It should be noted that if the mixture of emulsifying agents is introduced completely at the start of polymerization, or if one of the two emulsifiers is added alone at the end of polymerization while the other is continuously introduced during polymerization itself, the results obtained are very unsatisfactory and quite inferior to those obtained when operating according to the invention.

Best results are obtained with any given ammonium salt of the sulphocarboxylic acid ester with an aliphatic alcohol containing from 4 to 6 carbon atoms as the number of carbon atoms of the esterifying alcohol of the other emulsifier of the emulsifying system increase from 8 to 13. Thus the results improve on passing from octyl alcohol to decyl alcohol and up to tridecyl alcohol.

In particular, excellent results are obtained by using a mixture of ammonium diamylsulphosuccinate of the formula:

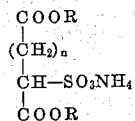

and ammonium bis-tridecyl-sulphosuccinate of formula:

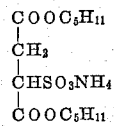

The quantity of the ammonium salt of the sulphocarboxylic acid ester with an aliphatic alcohol containing from 4 to 6 carbon atoms added to the aqueous emulsion is preferably from 0.05 to 2% by weight of the monomer or of the mixture of monomers to be polymerized.

The quantity of the ammonium salt of sulphocarboxylic acid ester with an aliphatic alcohol containing from 8 to 13 carbon atoms added to the aqueous emulsion is preferably from 0.05 to 2.5% by weight with respect to the weight of the monomer or of the mixture of monomers to be polymerized.

The process of the invention is easily controllable, although rapid, and allows polymerization of a monomeric component of more than 90% of the vinyl chloride monomer or mixture of vinyl chloride monomer with up to 25% of other copolymerizable vinyl monomers. The polymers or copolymers obtained, although having molecular weight and properties such as heat resistance which are similar to the polymers and copolymers obtained by conventional processes involving the seeding technique, form pastes with the usual plasticizers which, as has been noted above, are readily de-aerated, and which also have a particularly low viscosity, so that they are thus in a form which is advantageous for use in the manufacture of articles by techniques such as smearing immersion moulding, reject moulding and rotating mould moulding. Further, the polymers or copolymers obtained have a low inorganic salt content and can be transformed by any of the usual techniques into articles which have exceptional transparency and a low sensitivity to moisture.

One or more of the following vinyl monomers can be copolymerized with vinyl chloride by the process of the invention to produce copolymers containing at least 75% of polymerized vinyl chloride: vinyl fluoride; vinylidene fluoride; vinylidene chloride; vinyl acetate; acrylic acid; acrylic acid derivatives; acrylonitrile.

The invention is illustrated by the following examples:

EXAMPLE 1

A mixture of 7.5 parts of a seed latex containing 35% solids with a particle diameter of approximately 0.3 microns, 130 parts of water, and 0.1 part of sodium bicarbonate, was introduced into an enamelled 500 litre autoclave provided with heating, cooling and stirring means. After the air above the dispersion is displaced, 0.1 part of sodium bisulphite and 20 parts of vinyl chloride monomer were added simultaneously. The mass was brought to 50° C., and polymerization was started by continuously introducing at a predetermined rate of flow a solution consisting of 0.02 part of potassium persulphate in water.

After approximately one hour, 80 parts of vinyl chloride and an emulsifying system consisting of a solution of 0.3 part of ammonium diamylsulphosuccinate of formula:

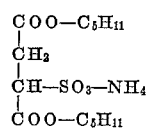

and 0.4 part of ammonium bistridecylsulphosuccinate of the formula:

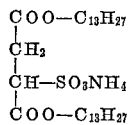

were added continuously.

Both the vinyl chloride and emulsifying system were added gradually over the whole reaction period which generally lasted from 6 to 7 hours. When almost all the vinyl chloride monomer had been used up, 0.35 part of emulsifying agent consisting of ammonium bis-tridecylsulphosuccinate were added to further stabilize the latex.

The residual monomer was freed from gas and the emulsion dried, for instance, with spray dryers.

The resulting polyvinyl chloride was a white powder which, on mixing with 60 parts of dioctylphthalate per 100 parts of polymer, produced a very fluid paste, the apparent viscosity of which, measured with a Brookfield model L.A.T. rotating viscosimeter, gave the following values at 25° C. and after 2 hours' aging.

| R.p.m. of viscosimeter: | Centipoises |
| --- | --- |
| 2.5 | 8,000 |
| 10 | 6,000 |
| 50 | 4,700 |
| 100 | 4,600 |

When this paste was kept for 20 minutes at 180° C., in suitable container, a gel of particular good transparency and clarity was obtained. Moreover, when the polymer was mixed in a planetary mixer, according to the following formulation:

| | Parts |
| --- | --- |
| Polyvinyl chloride | 100 |
| Dioctylphthalate | 60 |
| Dioctyladipate | 20 |
| Paraflex G-60 | 5 |
| Mark B B | 2 | a highly fluid paste was very easily obtained.

The formation of rapidly and continuously breaking foam could be observed at the surface of this paste. This indicated that the evolution of enclosed air occurred readily and spontaneously.

Moreover, when the paste was transformed into manufactured articles by the technique of moulding with a rotating mould, as, for example, in the art of producing puppets, products were obtained which showed complete absence of bubbles both within, and at the surface of, the plastic body.

On using polyvinyl chloride obtained by polymerization according to the known processes, in which the paste has not undergone de-aeration, articles made by the rotating mould technique were generally obtained which contained large number of bubbles of varying sizes.

EXAMPLE 2

The process was carried out as in Example 1, except that a mixture of 0.3 part of ammonium diamylsulphosuccinate and 0.45 part of ammonium bis-tridecylsulphosuccinate was used as the emulsifying system. When the total quantity of vinyl chloride had been polymerized, 0.37 part of ammonium bis-octylsulphosuccinate of the formula:

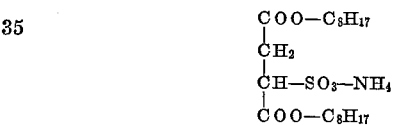

were introduced into autoclave to stabilize the latex.

The dried latex consisted of polyvinyl chloride which with 60 parts of dioctylphthalate per 100 parts of polymer formed a paste with an apparent viscosity not very different from that of the previous example, as will be seen from the following:

| R.p.m.: | Centipoises |
| --- | --- |
| 2.5 | 9,000 |
| 10 | 7,500 |
| 50 | 6,500 |
| 100 | 6,500 |

When this paste was treated according to the method described in Example 1, a product characterized by high fluidity was obtained with extreme facility. In this example also, the formation of rapidly and continuously breaking foam could be observed at the surface of this paste indicating that the enclosed air was being released spontaneously and easily.

Moreover, when the paste was used in the manufacture of articles products were obtained which showed complete absence of surface or internal bubbles.

EXAMPLE 3

Example 1 was repeated except that ammonium dioctylsulphosuccinate replaced ammonium bis-tridecylsulphosuccinate during the polymerization and was used for stabilizing the latex at the conclusion of the reaction.

The paste obtained by mixing dioctylphthalate (60 parts) with the resulting polyvinylchloride (100 parts) had a much higher apparent viscosity.

| R.p.m.: | Centipoises |
| --- | --- |
| 2.5 | 12,000 |
| 10 | 10,000 |
| 50 | 8,000 |
| 100 | 7,500 |

When this paste was then treated according to the method described in Example 1, a product characterized by a high fluidity was very easily obtained. The formation of rapidly and continuous breaking foam could be seen as the surface of this paste which indicated that the enclosed air was being freed spontaneously.

Moreover, when the paste was used for manufacturing articles products were obtained which showed complete absence of internal or surface bubbles.

TEST 1

Example 1 was repeated, except that the emulsifier continuously introduced during the polymerization process consisted only of 0.4 part of ammonium diamylsulphosuccinate.

In order to stabilize the latex, 1.0 part of ammonium bis-tridecylsulphosuccinate was added at the end of polymerization.

The polyvinyl chloride was mixed (100 parts) with dioctylphthalate (60 parts) and a paste was obtained, the apparent viscosity of which measured with a Brookfield model H.A.T. viscosimeter, was as follows:

*Viscosity of the paste*

| R.p.m.: | Centipoises |
| --- | --- |
| 2.5 | 26,000 |
| 10 | 16,500 |
| 50 | 15,000 |
| 100 | 11,000 |

It will be noted that the viscosity of the paste is much higher than in the previous examples in which an emulsifying system is used.

EXAMPLE 4

Example 1, was repeated except that the emulsifying mixture introduced continuously into the emulsion consisted of 0.3 parts of ammonium dibutylsulphosuccinate of the formula:

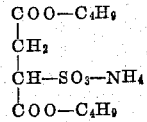

and 0.5 part of ammonium bis-tridecylsulphosuccinate, while the emulsifier introduced at the end of the polymerization reaction consisted of 0.3 part of ammonium dioctylsulphosuccinate.

On mixing 100 parts of the resulting polymer with 60 parts of plasticizers (dioctylphthalate), a very fluid paste was obtained, the apparent viscosity of which measured with a Brookfield model H.A.T. rotational viscosimeter, gave the following values:

| R.p.m. of the viscosimeter: | Centipoises |
| --- | --- |
| 2.5 | 8,000 |
| 10 | 8,000 |
| 50 | 7,000 |
| 100 | 6,000 |

When this paste was treated according to the methods described in Example 1, a product characterized by a high fluidity was very easily obtained. Again the formation of rapidly and continuously breaking foam could be observed on the surface of this paste.

Moreover, when the paste was transformed into manufactured articles as in the previous examples, products which showed complete absence of internal or surface bubbles were obtained.

We claim:

1. A process for aqueous emulsion polymerization by the seeding technique comprising polymerizing a monomeric component selected from the group of vinyl chloride and mixtures of vinyl chloride with other vinyl monomers copolymerizable therewith selected from the group consisting of vinyl fluoride, vinylidene fluoride, vinylidene chloride, vinyl acetate, acrylic acid and acrylonitrile to produce polymers containing at least 75% polymerized vinyl chloride, continuously adding to the aqueous emulsion for a period extending over at least the greater part of the period of polymerization an effective amount of an emulsifying system consisting of a mixture of two ammonium salts of different sulfocarboxylic acid esters, one of said salts having the general formula:

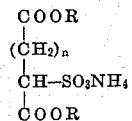

in which $n$ is 1, 2 or 3; and R is a straight or branched-chain alkyl radical containing from 4 to 6 carbon atoms, one of said salts being present in the emulsifying system in an amount of about 0.05 to 2% by weight of said monomeric component; the other of said salts having the general formula:

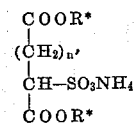

in which $n'$ is 1, 2 or 3; and $R^*$ is a straight or branched-chain alkyl radical containing 8 to 13 carbon atoms, said other salt being present in the emulsifying system in an amount of about 0.05 to 2.5% by weight of said monomeric component.

2. A process according to claim 1 in which the said emulsifying system consists of the ammonium sulphosuccinate of an aliphatic alcohol containing 4 carbon atoms with the ammonium sulphosuccinate of an aliphatic alcohol containing 13 carbon atoms.

3. A process according to claim 2 in which the said emulsifying system consists of ammonium dibutylsulphosuccinate and ammonium bis-tridecylsulphosuccinate.

4. A process according to claim 1 in which the said emulsifying system consists of the ammonium sulphosuccinate of an aliphatic alcohol containing 5 carbon atoms with the ammonium sulphosuccinate of an aliphatic alcohol containing 13 carbon atoms.

5. A process according to claim 4 in which the said emulsifying system consists of ammonium diamylsulphosuccinate and ammonium bis-tridecylsulphosuccinate.

6. A process according to claim 1 in which the said emulsifying system consists of the ammonium sulphosuccinate of an aliphatic alcohol containing 5 carbon atoms and the ammonium sulphosuccinate of an aliphatic alcohol containing 8 carbon atoms.

7. A process according to claim 6 in which the said emulsifying system consists of ammonium diamylsulphosuccinate and ammonium bis-octylsulphosuccinate.

8. A process according to claim 1 wherein an effective amount of an emulsifying agent is added to the aqueous emulsion when the polymerization is substantially complete to stabilize the reaction product.

9. A process according to claim 8 wherein the emulsifying agent selected from the group of compounds having the general formula:

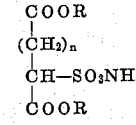

in which $n$ is 1, 2 or 3; and R is a straight or branched-chain alkyl radical containing from 4 to 6 carbon atoms, and

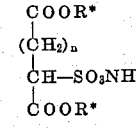

n which $n$ is 1, 2 or 3; and $R^*$ is a straight or branched-chain alkyl radical containing 8 to 13 carbon atoms.

References Cited

UNITED STATES PATENTS

| | | | |
|---|---|---|---|
| 2,540,438 | 2/1951 | Fuchs | 252—358 X |
| 2,843,576 | 7/1958 | Dunn et al. | 260—92.8 |
| 2,975,161 | 3/1961 | Abramo et al. | 260—85.5 |
| 3,068,184 | 12/1962 | Noorduyn et al. | 260—92.8 |
| 3,112,295 | 11/1963 | Marvel | 260—85.5 |
| 3,113,930 | 12/1963 | Chevalier | 252—358 |
| 3,115,472 | 12/1963 | Currie | 252—358 |
| 3,208,965 | 9/1965 | Kuhne | 260—92.8 |

FOREIGN PATENTS

| | | |
|---|---|---|
| 1,029,563 | 5/1958 | Germany. |
| 628,385 | 8/1963 | Belgium. |

JOSEPH L. SCHOFER, *Primary Examiner.*

DONALD E. CZAJA, *Examiner.*

H. WONG, *Assistant Examiner.*